Patented Sept. 29, 1953

2,653,972

UNITED STATES PATENT OFFICE 2,653,972

PROCESS OF PRODUCING LOWER ALKYL-, CARBOXYMETHYL-, DIETHERS OF POLYOXYALKYLENE GLYCOLS

Arthur B. Ash and Donald R. Jackson, Wyandotte, Mich., assignors to Wyandotte Chemicals Corporation, Wyandotte, Mich., a corporation of Michigan No Drawing. Application June 9, 1950, Serial No. 167,254

2 Claims. (Cl. 260—531)

The present invention relates to lower alkyl-, carboxymethyl-, diethers of polyoxyalkylene glycols wherein the polyoxyalkylene chain has a relatively high molecular weight of 270 and above.

Lower molecular weight compounds of this type, such as the methyl-, carboxymethyl-, diether of diethylene glycol (alternatively: "methyl diethylene glycol acetic acid") were synthesized by Palomaa and Siitonen, as disclosed in Berichte, vol. 63 B, p. 3117 (1930). The polyoxyalkylene group of such lower alkyl-, carboxymethyl-, diethers of polyoxyethylene glycols, so far as we are aware, has not been extended to above three ethenoxy groups, corresponding to a molecular weight of about 132. See U. S. Patent No. 2,010,154.

The new compounds of our invention, on the other hand, correspond to the following chemical formula:—

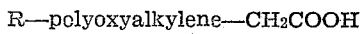

R—polyoxyalkylene—CH2COOH where R is lower alkyl, i. e. of less than 8 carbon atoms and preferably containing 1–4 carbon atoms, and "polyoxyalkylene" has terminal oxygen atoms and an average molecular weight of more than 270, preferably 270–750, and is selected from the group consisting of polyoxyethylene and polyoxypropylene groups. The polyoxyethylene and polyoxypropylene groups may be present in the molecule either severally or jointly, i. e. the polyoxyalkylene portion may be composed of oxyethylene (—C2H4O—) groups alone, oxypropylene (—C3H6O—) groups alone, a combination of a chain of oxyethylene groups linked to one or both terminals of a polyoxypropylene chain, and vice versa; or instead of conjugated polyoxyethylene and polyoxypropylene chains, such polyoxyalkylene portion may be a polymer of heteric or mixed ethylene- and propylene-oxides. Cf. U. S. Pat. No. 2,425,845.

These new compounds are synthesized by (1) the oxidation of a lower alkyl ether of a polyoxyalkylene glycol, in which case the terminal —CH2CH2OH group of a polyoxyethylene chain is oxidized to —CH2COOH, and the terminal

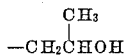

group of a polyoxypropylene glycol chain is oxidized to —CH2COOH, involving the splitting off of one —CH3 radical; and (2) the carboxymethylation of an alkali metal salt of a lower alkyl ether of a polyoxyalkylene glycol by means of a halogenated acetic acid.

The compounds of our invention are valuable intermediates in the preparation of organic esters which in turn find use in the textile and plastics fields; are useful as detergents and especially where slight acidity is desired without corrosive attack upon metals, such as in metal pickling baths and the removal of milkstone from dairy equipment; and are valuable as synthetic lubricants and hydraulic fluids, as compounding ingredients in pharmaceuticals and cosmetics, and as an ingredient of buffing, burnishing, grinding and cutting compounds in the metal finishing art.

The preferred process for synthesizing our new compounds generally involves the oxidation of a lower alkyl ether of a polyoxyalkylene glycol, the total average molecular weight of whose oxyalkylene groups is at least 270, in the presence of strong nitric acid. Suitably 2–5 mols of 30–70% HNO3 per mol of glycol ether are employed, and approximately 0.05–0.5% by weight (glycol ether basis) of ammonium vanadate as an oxidation catalyst. The oxidation reaction is conducted in an atmosphere saturated with nitrogen dioxide. Such saturation is accomplished by either feeding in a stream of nitrogen dioxide gas during the reaction, or by previously saturating the nitric acid solution with such gas. The temperature of the reaction is conducted in the range of 40–70° C. After evolution of oxides of nitrogen, excess nitric acid is removed by distilling under vacuum and "flashing" water through the reaction mass at a temperature of 50–60° C. and a pressure of about 5 mm. of Hg, to remove the last traces of HNO3.

The following examples serve to illustrate our invention in greater detail so that those skilled in the art shall be able more readily to understand and practice it.

*Example 1*

The starting material of this example was the methyl monoether of polyoxyethylene glycol according to the formula: CH3O(CH2CH2O)MH, where (CH2CH2O)M has a molecular weight of 728. To 200 grams (0.27 mol) of such methyl monoether of a polyoxyethylene glycol was added 121.4 grams (1.35 mols) of 70% nitric acid in which 0.2 gram of ammonium vanadate had been dissolved. The temperature was maintained at 50–55° C. and a stream of nitrogen dioxide was passed over the surface of the vigorously stirred solution for 20 minutes. The balance of the nitric acid was added over a 2 hour period. The temperature was elevated to 67° C. and a steady evolution of oxides of nitrogen was observed. The reaction mixture was then cooled to 55° C. and held for 2.4 hours, at which time the evolution of oxides of nitrogen had substantially ceased. The excess nitric acid was then removed by heating at about 50° C. at 25 mm. of mercury pressure. The last traces of nitric acid were removed effectively by reducing the pressure to about 5 mm. of mercury and "flashing" 200 ml. of water through the reaction mass by maintaining the temperature between 50 and 60° C. There was obtained 168 grams of product which analyzed 80% of free monocarboxylic acid of average molecular weight 764, and corresponding to the formula: $CH_3O(CH_2CH_2O)_{M'}CH_2COOH$, where $(CH_2CH_2O)_{M'}=728$ minus 44 (i. e. 1 mol of ethylene oxide) or 684 molecular weight.

This methyl-, carboxymethyl-, diether of polyoxyethylene glycol of molecular weight of about 674 had the following physical properties:

| | |
|---|---|
| Physical appearance | Transparent liquid |
| Density, $D_4^{25}$ | 1.1363 |
| Refractive index, $n_D^{25}$ | 1.4663 |
| Pour point, °F. | +77 |
| Viscosity, cps. (75° C.) | 37 |
| pH of 5% solution | 3.80 |
| Solubility | At least 5% in $CCl_4$ and water, at 30° C. |

Example 2

Here the starting material was a lower molecular weight methyl monoether of polyoxyethylene glycol, viz: $CH_3O(CH_2CH_2O)_MH$, where $(CH_2CH_2O)_M=317$ molecular weight. This methyl monoether of polyoxyethylene glycol in the amount of 350 grams (1.0 mol) was added to 450 grams (5.0 mols) of 70% nitric acid containing 0.4 gram of ammonium vanadate and saturated with $NO_2$. The temperature was maintained at 45–50° C. throughout the addition and was then lowered to 40–45° C. and the reaction mass was stirred for 3 hours until the evolution of oxides of nitrogen had substantially ceased. The unreacted nitric acid was removed as described in Example 1. There was obtained 354 grams of material which analyzed 86% of free carboxylic acid of average molecular weight 363, of the formula: $CH_3O(CH_2CH_2O)_{M'}CH_2COOH$; where $(CH_2CH_2O)_{M'}=273$ molecular weight.

This methyl-, carboxymethyl-, diether of polyoxyethylene glycol of approximately 273 molecular weight had the following physical properties:

| | |
|---|---|
| Physical appearance | Transparent liquid |
| Density, $D_4^{25}$ | 1.1488 |
| Refractive index, $n_D^{25}$ | 1.4590 |
| Pour point, °F. | −5 |
| Viscosity, cps.: | |
| 25° C. | 133 |
| 75° C. | 14.9 |
| pH of 5% solution | 3.85 |
| Solubility | At least 5% in $CCl_4$ and water, at 30° C. |

Example 3

The starting compound in this example was n-butyl monoether of polyoxypropylene glycol, according to the formula:

$$C_4H_9O(CH_2CH_3CHO)_MH$$

where $(CH_2CH_3CHO)_M=806$ molecular weight. Such n-butyl monoether of polyoxypropylene glycol was added in the amount of 109 grams (0.13 mol) to 125 grams (0.99 mol) of 70% nitric acid containing 0.2 gram of ammonium vanadate and previously saturated with $NO_2$. The addition required 15 minutes and the temperature was held at 45–52° C. The temperature was then lowered to 40–45° C. and the reaction mass was stirred for 7.5 hours until the evolution of oxides of nitrogen had substantially ceased. The reaction mass was worked up as described in Example 1. There was obtained 95 grams of product which analyzed 89% as free carboxylic acid of molecular weight 894, corresponding to the formula:

$$C_4H_9O(CH_2CH_3CHO)_{M'}CH_2COOH$$

$(CH_2CH_3CHO)_{M'}$ being equal to 748 molecular weight.

This n-butyl-, carboxymethyl-, diether of polyoxypropylene glycol of approximately 748 molecular weight had the following physical properties:

| | |
|---|---|
| Physical appearance | Opaque liquid |
| Density, $D_4^{25}$ | 1.1350 |
| Refractive index, $n_D^{25}$ | 1.4500 |
| Pour point, °F. | +3 |
| Viscosity, cps.: | |
| 25° C. | 395 |
| 75° C. | 30.8 |
| pH of 5% solution | 3.48 |
| Solubility | At least 5% in $CCl_4$ at 30° C., but insoluble in water |

Example 4

The compound oxidized was the n-butyl monoether of a polyoxyalkylene glycol of total average molecular weight 968 containing successive polyoxypropylene and polyoxyethylene chains as represented by the following chemical formula:

$$CH_3CH_2CH_2CH_2O(CH_2CH_3CHO)_M(CH_2CH_2O)_NH$$

where the molecular weight of $(CH_2CH_3CHO)_M$ and $(CH_2CH_2O)_N$ are approximately 737 and 157, respectively. (Such compound was prepared by the addition of approximately 3.56 mols of ethylene oxide to n-butyl ether of polyoxypropylene glycol 737.) A 100 gram sample of this compound was added to 32.5 grams of 70% nitric acid containing 0.2 gram of ammonium vanadate and saturated with $NO_2$. The mixture was then stirred at 45–47° C. for 10.5 hours or until the evolution of oxides of nitrogen had substantially ceased. The reaction mass was worked up as described in Example 1. There was obtained 94.5 grams of material which analyzed 66% as free carboxylic acid of average molecular weight 982.

This n-butyl-, carboxymethyl-, diether of polyoxypropylene 737 mol. wt.-polyoxyethylene 113 mol. wt. glycol had the following physical properties:

| | |
|---|---|
| Physical appearance | Transparent liquid |
| Density, $D_4^{25}$ | 1.0510 |
| Refractive index, $n_D^{25}$ | 1.4548 |
| Pour point, °F. | −11 |
| Viscosity, cps.: | |
| 25° C. | 389 |
| 75° C. | 40.6 |
| pH of 5% solution | 4.92 |
| Solubility | At least 5% in $CCl_4$ at 30° C., but insoluble in water |

Example 5

A mixture of ethylene and propylene oxide was prepared in which the mol ratio of ethylene oxide to propylene oxide was 2.6 to 1. This mixture was then reacted with isopropyl alcohol in the presence of a small amount of sodium hydroxide. The low boiling material was distilled off and the resulting product was found on analysis to have an average molecular weight of 398.

One hundred grams of this product was then added over a 20 minute period to 448 grams of 42° Bé. (67.2%) nitric acid containing 0.5 gram of ammonium vanadate as catalyst. The temperature was maintained throughout at 42–50° C. and the reaction was stirred for a total of 4½ hours. The excess nitric acid was removed and the carboxylic acid was isolated as described in Example 1. The product was the isopropyl-, carboxymethyl ether of a mixed ethylene-propylene glycol of approximately 350 molecular weight.

It pill be apparent to those skilled in the art that our invention may equivalently include within its scope salts of the di-ethers, i. e., those wherein a metallic ion (which includes NH₄—) is substituted for the terminal hydrogen atom of the carboxymethyl group according to the following exemplary formula:

R—polyoxyalkylene—CH₂COOX where: X is a metal or ammonium ion.

The appended claims are intended to include such salts within their scope in the definition of "di-ethers of polyoxyalkylene glycols."

Other modes of applying the principle of our invention may be employed, changes being made as regards to the details described, provided the features stated in any of the following claims or the equivalent of such be employed.

We, therefore, particularly point out and distinctly claim as our invention:

1. The method of making mixtures of lower alkyl-, carboxymethyl-, diethers of polyoxyalkylene glycols of the type formula:

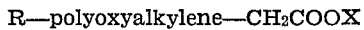

R—polyoxyalkylene—CH₂COOH where: R is lower alkyl, and "Polyoxyalkylene" has terminal oxygen atoms and an average molecular weight of at least 286 and is selected from the group consisting of polymers of oxyethylene- and oxypropylene- groups, taken both individually and jointly, which comprises oxidizing a mixture of lower alkyl ethers of a polyoxyalkylene glycol, the total molecular weight of whose oxyalkylene groups is at least 330, in a reaction atmosphere that is saturated with nitrogen dioxide, such oxidation being conducted in the presence of 2–5 mols of 30–70% HNO₃ per mol of said polyoxyalkylene glycol ether at a temperature of 40–70° C.

2. The method as in claim 1 wherein ammonium vanadate is present as an oxidation catalyst.

ARTHUR B. ASH.
DONALD R. JACKSON.

References Cited in the file of this patent

UNITED STATES PATENTS

| Number | Name | Date |
|---|---|---|
| 2,010,154 | Hubacher | Aug. 6, 1935 |
| 2,183,853 | Haussmann et al. | Dec. 19, 1939 |
| 2,280,792 | Bruson | Apr. 28, 1942 |

FOREIGN PATENTS

| Number | Country | Date |
|---|---|---|
| 470,181 | Great Britain | Aug. 3, 1937 |
| 228,415 | Switzerland | Jan. 3, 1944 |

OTHER REFERENCES

Palomaa et al.: Ber. Deut. Chem., vol. 63B, pp. 3117–20 (1930).